(12) United States Patent
Yamazoe

(10) Patent No.: US 10,176,158 B2
(45) Date of Patent: Jan. 8, 2019

(54) INFORMATION PROCESSING APPARATUS

(71) Applicant: FUJI XEROX CO., LTD., Tokyo (JP)

(72) Inventor: Nobuyuki Yamazoe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/726,016

(22) Filed: Oct. 5, 2017

(65) Prior Publication Data

US 2018/0276191 A1 Sep. 27, 2018

(30) Foreign Application Priority Data

Mar. 22, 2017 (JP) .................................. 2017-055217

(51) Int. Cl.
G06F 3/0484 (2013.01)
G06F 17/24 (2006.01)
H04L 29/06 (2006.01)
H04L 29/08 (2006.01)

(52) U.S. Cl.
CPC ........ G06F 17/241 (2013.01); G06F 3/04842 (2013.01); G06F 3/04845 (2013.01); H04L 65/403 (2013.01); H04L 67/10 (2013.01)

(58) Field of Classification Search
CPC ............ G06F 3/04842; G06F 3/04845; G06F 17/241; H04L 65/403; H04L 67/10
USPC ........................................................ 715/232
See application file for complete search history.

(56) References Cited

U.S. PATENT DOCUMENTS

2015/0220257 A1* 8/2015 Moore ................ G06F 3/04845
715/765

FOREIGN PATENT DOCUMENTS

JP 2011039942 A * 2/2011 ............. G06F 13/00
JP 5212310 B2 6/2013

* cited by examiner

*Primary Examiner* — Scott T Baderman
*Assistant Examiner* — Hassan Mrabi
(74) *Attorney, Agent, or Firm* — Oliff PLC

(57) ABSTRACT

An information processing apparatus includes a copying unit and an extracting unit. The copying unit is configured to copy a first sticky note pasted on a first mount onto a second mount as a second sticky note. The extracting unit is configured, when the second sticky note is reflected to another mount, to extract a third mount in addition to the first mount as candidates. The extracting unit extracts the third mount as the candidate according to a predetermined rule.

6 Claims, 16 Drawing Sheets

FIG.4

| 402 | 404 | 406 | 408 | 410 | 412 | 414 | 416 | 418 | 420 | 422 |
|---|---|---|---|---|---|---|---|---|---|---|
| STICKY NOTE ID | PASTING MOUNT ID | PASTING POSITION | SIZE | CREATION DATE/TIME | CREATOR | PASTING DATE/TIME | COLOR | FRAME LINE SHAPE | FRAME LINE COLOR | FRAME LINE THICKNESS |
| FC001 | | (100, 200) | (10, 5) | | KF | | | | | |

400

| 424 | 426 | 428 | 430 | 432 | | 438 | | 444 | | |
|---|---|---|---|---|---|---|---|---|---|---|
| BELONGING GROUP | ATTRIBUTE | CONTENT TYPE | CONTENT | COPY SOURCE INFORMATION | | COPY DESTINATION INFORMATION | | RELATED STICKY NOTE INFORMATION 448 | | |
| | | | | 434 | 436 | 440 | 442 | 446 | | |
| | | | | MOUNT ID | STICKY NOTE ID | MOUNT ID | STICKY NOTE ID | PARENT STICKY NOTE ID | CHILD STICKY NOTE ID | |
| | | TEXT | | | | | | | | |

FIG.5

| MOUNT ID 510 | MOUNT PATTERN ID 515 | TASK 520 | TASK ATTRIBUTE 525 | CREATION DATE/TIME 530 | CREATOR 535 | ATTRIBUTE 540 | PROJECT ID 545 |
|---|---|---|---|---|---|---|---|
| | | | | | | | |

| PROJECT ID 610 | NUMBER OF MEMBERS 615 | MEMBER ID 620 | NUMBER OF MOUNTS 625 | MOUNT ID 630 |
|---|---|---|---|---|
| | | | | |

| LOG ID | DATE/TIME | OPERATOR ID | TARGET MOUNT ID | TARGET STIKCY NOTE ID | PROCESSING CONTENTS |
|---|---|---|---|---|---|
| | | | | | |

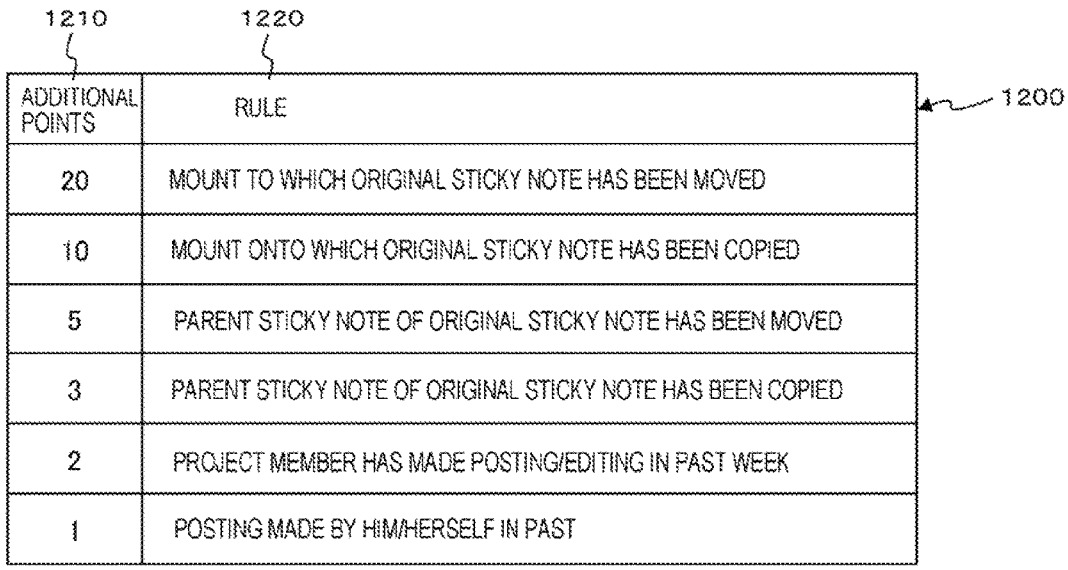

| ADDITIONAL POINTS | RULE |
|---|---|
| 20 | MOUNT TO WHICH ORIGINAL STICKY NOTE HAS BEEN MOVED |
| 10 | MOUNT ONTO WHICH ORIGINAL STICKY NOTE HAS BEEN COPIED |
| 5 | PARENT STICKY NOTE OF ORIGINAL STICKY NOTE HAS BEEN MOVED |
| 3 | PARENT STICKY NOTE OF ORIGINAL STICKY NOTE HAS BEEN COPIED |
| 2 | PROJECT MEMBER HAS MADE POSTING/EDITING IN PAST WEEK |
| 1 | POSTING MADE BY HIM/HERSELF IN PAST |

FIG.12B

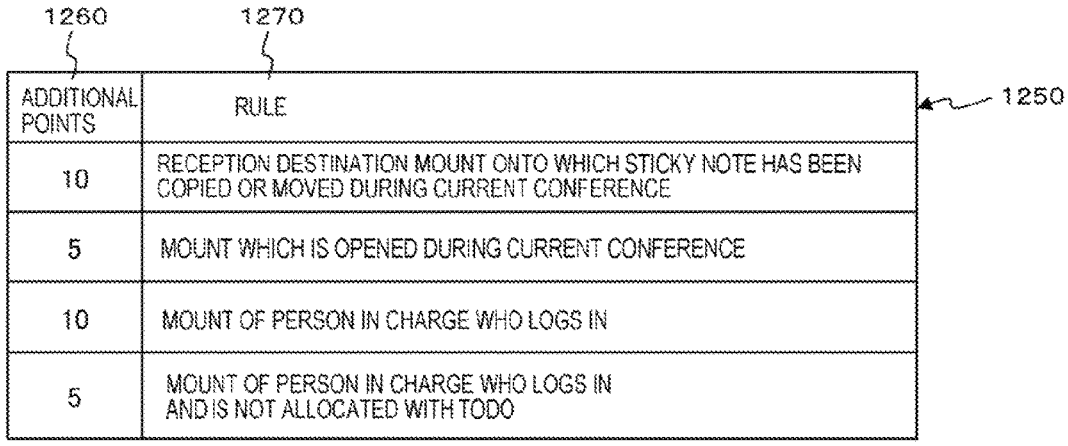

| ADDITIONAL POINTS | RULE |
|---|---|
| 10 | RECEPTION DESTINATION MOUNT ONTO WHICH STICKY NOTE HAS BEEN COPIED OR MOVED DURING CURRENT CONFERENCE |
| 5 | MOUNT WHICH IS OPENED DURING CURRENT CONFERENCE |
| 10 | MOUNT OF PERSON IN CHARGE WHO LOGS IN |
| 5 | MOUNT OF PERSON IN CHARGE WHO LOGS IN AND IS NOT ALLOCATED WITH TODO |

INFORMATION PROCESSING APPARATUS

CROSS-REFERENCE TO RELATED APPLICATIONS

This application is based on and claims priority under 35 USC 119 from Japanese Patent Application No. 2017-055217 filed Mar. 22, 2017.

BACKGROUND

Technical Field

The present invention relates to an information processing apparatus.

SUMMARY

According to an aspect of the invention, an information processing apparatus includes a copying unit and an extracting unit. The copying unit is configured to copy a first sticky note pasted on a first mount onto a second mount as a second sticky note. The extracting unit is configured, when the second sticky note is reflected to another mount, to extract a third mount in addition to the first mount as candidates. The extracting unit extracts the third mount as the candidate according to a predetermined rule.

BRIEF DESCRIPTION OF THE DRAWINGS

Exemplary embodiments of the present invention will be described in detail based on the following figures, wherein:

FIG. 4 is an explanatory view illustrating an exemplary data structure of a sticky note information table;

FIG. 5 is an explanatory view illustrating an exemplary data structure of a mount information table;

FIG. 6 is an explanatory view illustrating an exemplary data structure of a project/mount correspondence table;

FIG. 7 is an explanatory view illustrating an exemplary data structure of a log information table;

FIGS. 12A and 12B are explanatory views illustrating exemplary data structures of a determination condition tables;

DETAILED DESCRIPTION

Hereinafter, an exemplary embodiment of the present invention will be described with reference to the accompanying drawings.

Figure 1:
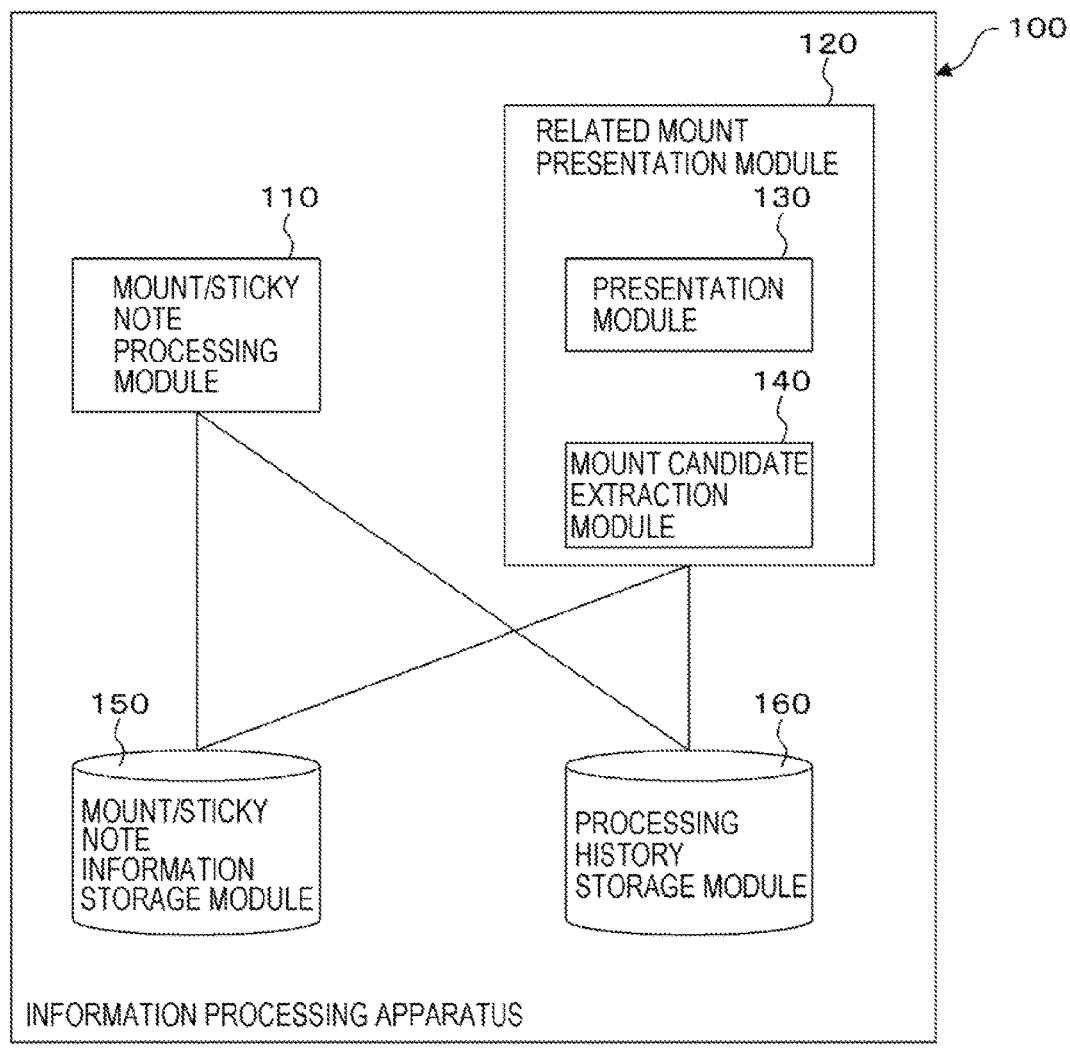
FIG. 1 is a conceptual module configuration diagram of an exemplary configuration of an exemplary embodiment.

FIG. 1 is a conceptual module configuration diagram of an exemplary configuration of an exemplary embodiment.

A module, in general, indicates a logically separable component such as software (computer program) or hardware. Accordingly, a module in the present exemplary embodiment indicates not only a module in a computer program but also a module in a hardware configuration. Thus, the descriptions of the present exemplary embodiment also include descriptions of a computer program to serve as a module (a program that causes a computer to execute respective processes, a program that causes a computer to serve as respective units, and a program that causes a computer to implement respective functions), a system, and a method. For convenience of descriptions, the expressions "store," "caused to store," and equivalent expressions thereto will be used. If an exemplary embodiment is directed to a computer program, the expressions indicate storing data or the like in a memory device or performing a control to cause data or the like to be stored in a memory device. In addition, one module may correspond to one function. In implementation, however, one module may be configured with one program, plural modules may be configured with one program, and in reverse, one module may be configured with plural programs. Further, plural modules maybe executed by one computer, or one module maybe executed by plural computers in a distributed or parallel environment. In addition, one module may include another module. Hereinafter, the term "connection" is also used for a logical connection (for example, data exchange, instructions, and a reference relationship among data), in addition to a physical connection. The term "predetermined" used herein refers to being determined before a targeted process and, more specifically, means being determined not only before a process according to the exemplary embodiment is started but also before a targeted process even after the process according to the exemplary embodiment is started, in accordance with the situation/state at that time or the situation/state so far. If there are plural "predetermined values", the predetermined values may be different from each other, or two or more (may include all, of course) of the predetermined values maybe the same. In addition, the description "when it is A, B is performed" indicates that "it is determined whether it is A, and if it is determined that it is A, B is performed," except for a case where it is unnecessary to make the determination as to whether it is A. If items are enumerated like "A, B, and C," the enumeration is merely exemplary and includes a case of selecting only one (for example, only A) of the items, unless otherwise specified.

In addition, a system or device includes a system or device which is implemented by one computer, hardware component, device or the like, in addition to a system or device configured such that plural computers, hardware components, devices and the like are connected to each other by a communication unit such as a network (including a one-to-one corresponding communication connection). The terms "device" and "system" are synonymous with each other. Of course, the "system" does not include a system merely meaning a social "structure" (social system) which is an artificial engagement.

In addition, target information is read from a memory device per process by each module or for each of plural processes which are executed in a module. After the process is executed, the process result is stored in the memory device. Accordingly, descriptions of reading from the memory device prior to the process and storing in the memory device after the process may be omitted. Examples of the storage device may include a hard disk, a random access memory (RAM), an external storage medium, a storage device connected through a communication line, and a register in a central processing unit (CPU).

Referring to FIG. 1, an information processing apparatus 100 according to the present exemplary embodiment performs a process related to mounts and sticky notes (also referred to as electronic sticky notes, electronic cards, and the like) used at a gathering. The information processing apparatus 100 includes a mount/sticky note processing module 110, a related mount presentation module 120, a mount/sticky note information storage module 150, and a processing history storage module 160. It should be noted that the term "gathering" may refer to an event where plural people meet together for conversation and may include, for example, a conference, a workshop, an idea extraction meeting, a review meeting, a consultation, a discussion, an assembly, and a meeting. This exemplary embodiment is directed to an electronic sticky note system (also referred to as an electronic whiteboard or the like) using electronic sticky notes and electronic mounts.

Figure 3A:
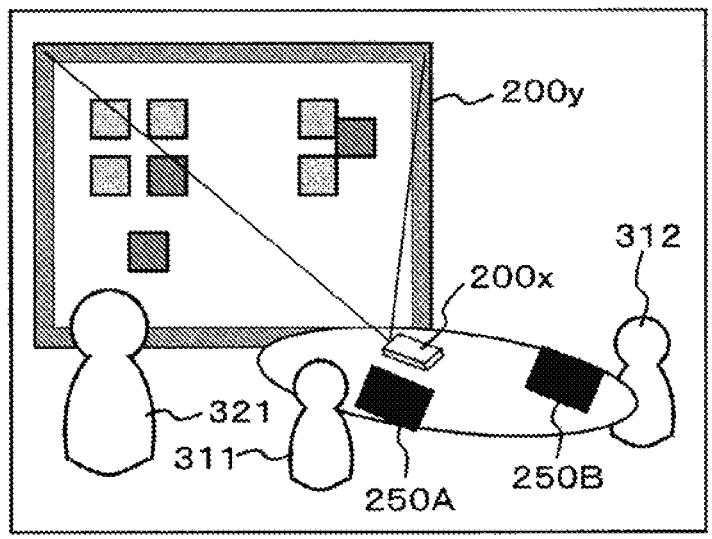
FIGS. 3A to 3C are explanatory views illustrating an exemplary use of an electronic sticky note terminal and a shared screen control device in a conference room or the like in which the exemplary embodiment is used.
Figure 3B:
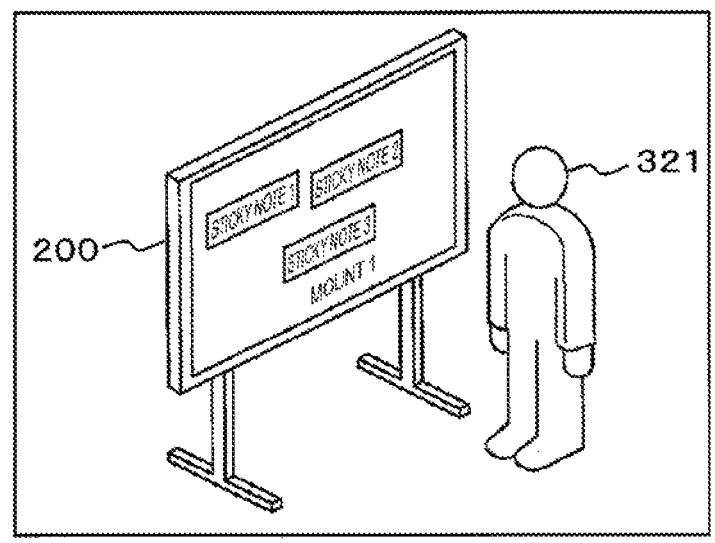
Figure 3C:
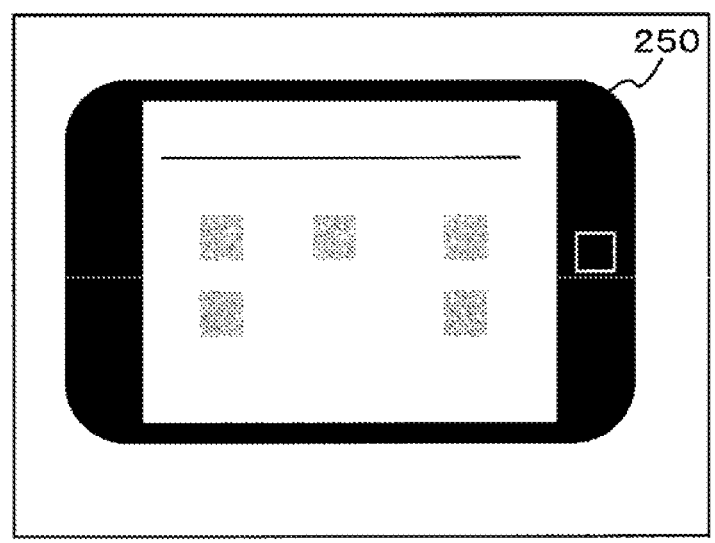

Specifically, a shared screen control device 200 is used at a gathering of a facilitator (generally one person) and plural participants using sticky notes. Each participant uses an electronic sticky note terminal 250 as a participant terminal to create a sticky note in which ideas and the like are written. In general, as illustrated in the example of FIGS. 3A to 3C, the electronic sticky note terminal 250 may include plural electronic sticky note terminals, such as an electronic sticky note terminal 250A and an electronic sticky note terminal 250B, possessed by the respective participant (hereinafter collectively referred to as the electronic sticky note terminal 250). Then, the shared screen control device 200 receives the sticky note from the electronic sticky note terminal 250 and pastes the sticky note onto a mount (or background). The facilitator progresses the gathering by using a shared screen which is a display device of the shared screen control device 200, to determine or change a position of the sticky note on the mount, combine sticky notes (associate a first sticky note and a second sticky note with each other; which may be referred to as group formation), or create sticky note information by him/herself. In this exemplary embodiment, the facilitator is included in the participants. A project manager may or may not be included in the participants. Application of rules using FIGS. 12A and 12B will be described later.

First, a job using a mount will be described. It should be noted that this description aims at facilitating the understanding of the present exemplary embodiment.

The information processing apparatus 100 of the present exemplary embodiment is particularly used when sticky notes are used in a task management system (also referred to as a project portal) in a project, an individual task management system, or the like. Mounts are also used in this task management.

For example, in a gathering (project) using an electronic sticky note system, a TODO sticky note on which who, by when, and what to do are written may be created. This TODO sticky note may not be used in a state of being pasted on a mount. Therefore, the TODO sticky note is copied onto a mount of the task management system or the like in the project. A mount and a TODO sticky note of a copy source are designated as a mount A and a TODO sticky note A, respectively, and a mount and a TODO sticky note of a copy destination are designated as a mount B and a TODO sticky note B, respectively. The TODO sticky note B may be rewritten in the mount B of the copy destination. For example, the TODO sticky note B is rewritten to indicate that jobs of the contents of TODO is completed, the interim report is written, a person in charge is changed, the due date is changed, or the like. When the TODO sticky note B is rewritten, the TODO sticky note A in the mount A of the copy source is also rewritten. However, there is a case where the TODO sticky note A is coped onto another mount C other than the mount B, which generates a TODO sticky note C. For example, in a situation where the mount C is created based on the mount A and is mainly used, a mount to which the TODO sticky note B should be reflected (a mount which should be synchronized with the TODO sticky note B) is the mount C rather than the mount A. This is because the mount A is a thing of the past which may be seen by nobody.

In such a case, the information processing apparatus 100 extracts the mount C to which the contents of the TODO sticky note B should be reflected in addition to the mount A and presents the mount A and the mount C to a user in a selectable manner.

The mount/sticky note processing module 110 is connected to the mount/sticky note information storage module 150 and the processing history storage module 160. The mount/sticky note processing module 110 processes mounts and sticky notes in the electronic sticky note system. Specifically, the mount/sticky note processing module 110 creates a sticky note, pastes a sticky note on a mount, groups sticky notes (puts plural sticky notes together), moves a sticky note onto a mount, and the like.

Further, for example, the mount/sticky note processing module 110 copies a first sticky note pasted on a first mount, onto a second mount as a second sticky note. This copying process may be performed according to a user's operation or may be performed according to a predetermined program. As described above, copying the TODO sticky note A pasted on the mount A onto the mount B used in the task management system or the like falls under this copying process. Copying the TODO sticky note A pasted on the mount A onto the mount C other than the mount B also falls under this copying process.

The related mount presentation module 120 includes a presentation module 130 and a mount candidate extraction module 140. The related mount presentation module 120 is connected to the mount/sticky note information storage module 150 and the processing history storage module 160. If the contents of the second sticky note on the second mount are rewritten and if the second sticky note is reflected to another mount, the related mount presentation module 120 extracts a mount to which the second sticky note should be reflected.

The presentation module 130 presents the mount extracted by the mount candidate extraction module 140 in such a manner that the extracted mount is selectable by a user's operation. In general, the number of mounts extracted by the mount candidate extraction module 140 is two or more, and it is necessary for a user to select. However, even if the mount candidate extraction module 140 extracts one mount, the mount is presented in a selectable manner so that the user checks whether or not the sticky note should be reflected to the extracted one mount.

Depending on whether or not a user has a permission to view (access) the mounts presented as the candidates, the presentation module 130 may present the candidate mounts in different forms. The candidate mounts maybe presented so that the contents of the candidate mounts of the reflection destination (the mounts extracted by the mount candidate extraction module 140) are understood. If the names of the mounts are only displayed, it is difficult to determine which mount should be selected. Therefore, for example, thumbnails (reduced images) of the candidate mounts are displayed. However, if a user has no permission to view the mount in interest, the thumbnail thereof may not be displayed. Therefore, if the user has the view permission, thumbnails of the mounts are displayed, and if the user does not have the view permission, the names of the mounts are displayed.

When the second sticky note is reflected to another mount by using information in the mount/sticky note information storage module 150 and the processing history storage module 160, the mount candidate extraction module 140 extracts a third mount in addition to the first mount as the candidates.

Generally, "when the second sticky note is reflected to another mount" is triggered by the event such that the contents of the second sticky note are changed. However, it should be noted that a condition that the contents of the second sticky note are changed is not always required.

The expression "when the second sticky note is reflected to another mount" includes returning the second sticky note to the first mount of the copy source.

In general, the first mount is a shared mount which may be viewed by plural users.

In general, the second mount is an individual mount which mainly has the function of TODO processing.

For example, the first mount is used in a project in which a user of the second mount is participating and, as a conclusion at a gathering, the first sticky note in which an "action to be done (so-called action item)" is written is generated. Then, by copying the first sticky note onto a mount of a user in charge (that is, by generating the second sticky note on the mount of the user), the number of items of TODO processing for the user is increased. Therefore, the second sticky note on which actions to be done by the user of the second mount are written. A progress is shown thereon by the operation of the user. Then, in order to report the second sticky note on which the progress state is written to project members, the second sticky note is reflected to mounts used in the project. However, it is not always sufficient to reflect the second sticky note to the first mount that is the original mount. This is because the mounts used in the project may be changed and different from the first mount.

The mount candidate extraction module 140 extracts the third mount as the candidate according to a predetermined rule. Here, one or more of the followings may be used as the "predetermined rule".

(1) Mount onto which the first sticky note is copied or moved;

(2) Mount onto which a sticky note related to the first sticky note is copied or moved;

(3) Mount whose number of times operated by a participant of a group to which a user of the second mount belongs is equal to or greater than a predetermined value; and (4) Mount whose number of times operated by the user of the second mount is equal to or greater than the predetermined value.

It should be noted that the second sticky mount is not included in the mount onto which the first sticky note is copied or moved. This is because the second sticky note is pasted on the second mount in the first place and, accordingly, there is no need to reflect the second sticky note.

Points are allocated to each of these rules (1) to (4). The mount candidate extraction module 140 may extract the mount candidates based on the sum of the points.

The mount/sticky note information storage module 150 is connected to the mount/sticky note processing module 110 and the related mount presentation module 120. The mount/sticky note information storage module 150 stores information on mounts and sticky notes in the electronic sticky note system. In addition, if a sticky note is copied among mounts, information on a mount of the copy source and the mounts of the copy destination is stored. These will be described later using examples of FIGS. 4, 5, 6, 9 and 12.

The processing history storage module 160 is connected to the mount/sticky note processing module 110 and the related mount presentation module 120. The processing history storage module 160 stores an operation history in the electronic sticky note system. For example, a process of copying a sticky note among mounts and the like is stored. These will be described later using an example of FIG. 7.

Figure 2:
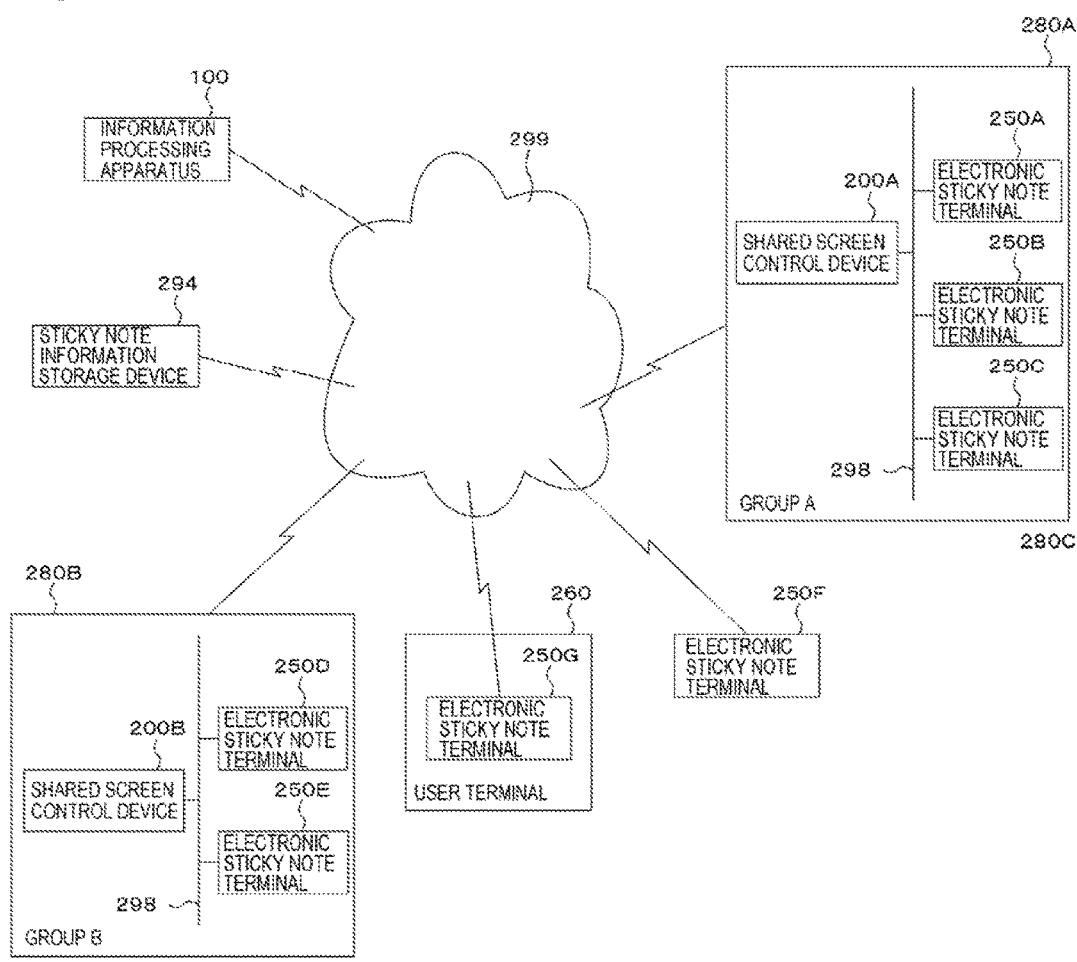
FIG. 2 is an explanatory view illustrating an exemplary system configuration using the exemplary embodiment.

FIG. 2 is an explanatory view illustrating an exemplary system configuration using the present exemplary embodiment.

In a group A 280A, a shared screen control device 200A, an electronic sticky note terminal 250A, an electronic sticky note terminal 250B, and an electronic sticky note terminal 250C are provided, and a gathering is held. The shared screen control device 200A, the electronic sticky note terminal 250A, the electronic sticky note terminal 250B, and the electronic sticky note terminal 250C are interconnected with each other via a communication line 298.

In a group B 280B, a shared screen control device 200B, an electronic sticky note terminal 250D, and an electronic sticky note terminal 250E are provided, and a gathering is held. The shared screen control device 200B, the electronic sticky note terminal 250D, and the electronic sticky note terminal 250E are interconnected with each other via a communication line 298.

In addition, the information processing apparatus 100, a sticky note information storage device 294, the devices in the group A 280A, the devices in the group B 280B, an electronic sticky note terminal 250F, and an electronic sticky note terminal 250G in a user terminal 260 are interconnected with each other via a communication line 299. The communication line 298 and the communication line 299 maybe wireless, wired, or a combination thereof. For example, the communication line 298 and the communication line 299 may be the Internet, an intranet, or the like as a communication infrastructure. The functions of the information processing apparatus 100 and the sticky note information storage device 294 may be implemented by a cloud service.

The sticky note information storage device 294 stores information on sticky notes. Each shared screen control device 200 performs processes using the sticky note information storage device 294. In this case, the information on sticky notes stored in the sticky note information storage device 294 may be shared by the plural shared screen control devices 200. That is, the information on sticky notes managed by the shared screen control device 200A may be used by the shared screen control device 200B.

The user terminal 260 may have a function as the electronic sticky note terminal 250G.

Copying of sticky notes among mounts may be performed within the same group (gathering). A sticky note maybe copied onto a mount handled by another group (gathering), a mount in task management used by a group, or a mount in task management used by an individual user such as the electronic sticky note terminal 250F or the user terminal 260.

FIGS. 3A to 3C are explanatory views illustrating examples of use of the electronic sticky note terminal 250 and the shared screen control device 200 in a conference room or the like in which the present exemplary embodiment is used.

As illustrated in the example of FIG. 3A, participants 311 and 312 and a facilitator 321 are gathered in a conference room or the like. The participant 311 uses the electronic sticky note terminal 250A and the participant 312 uses the electronic sticky note terminal 250B. Generally, one terminal device (such as the electronic sticky note terminal 250A) is assigned to one participant and may be a tablet type terminal having a notebook size (for example, A4 or B5 size, 7 to 10 inches, or the like) which is operated using a finger or a pen, like an electronic sticky note terminal 250 illustrated in the example of FIG. 3C. The participants create sticky note information in which text data, handwritten characters, figures, and the like are described. The terminal device is not limited to the tablet type terminal, but may be a PC (including a notebook PC) or the like having a keyboard, a mouse, and the like.

A shared screen control device 200x illustrated in the example of FIG. 3A is a projector which displays mounts and sticky notes. A shared screen control device 200y is an electronic whiteboard which detects the motion of a finger, a pen, or the like of the facilitator 321 and receives an operation such as pasting a sticky note on a mount (table), moving a sticky note, associating (grouping) sticky notes, and the like. For example, a pen is provided in the shared screen control device 200y. The shared screen control device 200y receives an operation for mounts and sticky notes by detecting that the pen has been moved away from a predetermined pen holder (that the facilitator 321 has lifted the pen for operation) and detecting a position of the tip of the pen (touch of the tip of the pen to the shared screen control device 200y, and the like). For example, a sensor (such as a sensor whose switch is turned on and off by gravity of the pen) is provided on the pen holder. In this case, the sensor may be used to determine which of plural pens (a black pen, a red pen, a blue pen, and the like) is being used. Further, for example, the entire display screen of the shared screen control device 200y may be a touch sensor. In this case, the touch sensor may be used to detect the position and pressure of a touch on the display screen. In this example, on/off of the pen is controlled by the pen holder, but there is no necessity to provide the pen holder. The on/off of the pen maybe directly controlled on the pen side. Regarding color change, without requiring the pen holder, a color palette may be provided on a portion of the display screen, and a color is changed by touching a target color with the pen or the like. Alternatively, the pen may be equipped with a function (such as a button or a slider) for instructing the pen to change a color.

Further, the shared screen control device 200 may be an electronic board as illustrated in the example of FIG. 3B. In general, an electronic board has a large-screen display device (at least larger than the display device of the electronic sticky note terminal 250) which is a touch panel to detect the position and pressure of a touch on a display screen. For example, the display screen may have a size of 80 inches or the like.

FIG. 4 is an explanatory view illustrating an exemplary data structure of a sticky note information table 400 that stores information on sticky notes. The sticky note information table 400 is stored in the mount/sticky note information storage module 150. The sticky note information table 400 includes a sticky note ID column 402, a pasting mount ID column 404, a pasting position column 406, a size column 408, a creation date/time column 410, a creator column 412, a pasting date/time column 414, a color column 416, a frame line shape column 418, a frame line color column 420, a frame line thickness column 422, a belonging group column 424, an attribute column 426, a content type column 428, a content column 430, a copy source information column 432, a copy destination information column 438, and a related sticky note information column 444.

The copy source information column 432 has a mount ID column 434 and a sticky note ID column 436. The copy destination information column 438 has a mount ID column 440 and a sticky note ID column 442. The related sticky note information column 444 has a parent sticky note ID column 446 and a child sticky note ID column 448.

The sticky note ID column 402 stores information (sticky note identification (ID)) which uniquely identifies a sticky note in this exemplary embodiment. In the present exemplary embodiment, the pasting mount ID column 404 stores information (pasting mount ID) which uniquely identifies a mount on which the sticky note is pasted. The pasting position column 406 stores a position at which the sticky note is pasted, that is, a pasting position on the mount. For example, this position is represented by coordinates in the XY coordinate system of the mount. The size column 408 stores the size of the sticky note. For example, when a sticky note to be displayed is rectangular, the size column 408 stores the width and height of the rectangular sticky note. The creation date/time column 410 stores the date/time (year, month, day, hour, minute, second or less, or a combination thereof) at which the sticky note is created. The creator column 412 stores a creator (creator ID) of the sticky note. Alternatively, an information processing apparatus (a device ID of the electronic sticky note terminal 250 or the shared screen control device 200) on which the sticky note is created may be stored. The pasting date/time column 414 stores the date/time at which the sticky note is pasted on the mount. The color column 416 stores a display color of the sticky note. The frame line shape column 418 stores a frame line shape (a solid line, a dotted line, a broken line, a wavy line, a double line, and the like) in the display of the sticky note. The frame line color column 420 stores a color of a frame line in the display of the sticky note. The frame line thickness column 422 stores the thickness of the frame line in the display of the sticky note. The belonging group column 424 stores information on a group to which the sticky note belongs. For example, the belonging group column 424 may store information indicating whether or not the sticky note belongs to a group. If the sticky note belongs to a group, the belonging group column 424 may store a group ID, IDs of other sticky notes belonging to the group, and the like. The attribute column 426 stores attributes of the sticky note. Examples of the contents of the attribute column 426 may include "facts", "task", "policy", "TODO", and the like. The content type column 428 stores the content types of the sticky note (text information, vector data indicating handwritten characters or figures, voice information, still image information such as pictures, moving image information, or combinations thereof). The content column 430 stores the contents written in the sticky note. The copy source information column 432 and the copy destination information column 438 store information when copying among mounts is performed. When copying among the mounts is performed, the copy source information column 432 is used if a sticky note in interest is a sticky note of the copy source, and the copy destination information column 438 is used if the sticky note in interest is a sticky note of the copy destination. Therefore, when a sticky note is copied from another mount and then copied onto a further another mount, both the copy source information column 432 and the copy destination information column 438 are used. The copy source information column 432 stores information on the copy source of the sticky note. The mount ID column 434 stores a mount ID of the mount of the copy source. The sticky note ID column 436 stores a sticky note ID of the sticky note on the mount of the copy source. The copy destination information column 438 stores information on the copy destination of the sticky note. The mount ID column 440 stores a mount ID of the mount of the copy destination. The sticky note ID column 442 stores a sticky note ID of the sticky note on the mount of the copy destination. The related sticky note information column 444 stores information on a sticky note related to that sticky note. Here, a tree structure of sticky notes is showed as an example of a relationship among sticky notes. The parent sticky note ID column 446 stores an ID of a parent sticky note of the sticky note. The child sticky note ID column 448 stores an ID of a child sticky note of the sticky note. Plural sticky note IDs may be stored in the parent sticky note ID column 446 and the child sticky note ID column 448. It should be noted that when copying among mounts is performed, the original sticky note ID may be used without changing the sticky note ID. In this case, a corresponding sticky note may be determined based on whether or not the sticky note ID is identical. Further, when copying among mounts is performed, a new sticky note ID may be used. In this case, by tracing the copy source information column 432 and the copy destination information column 438, the correspondence between a sticky note of the copy source and a sticky note of the copy destination may be obtained. Even when copying is performed on plural mounts, by tracing the copy source information column 432 and the copy destination information column 438, it is possible to extract all sticky notes to be reflected.

FIG. 5 is an explanatory view illustrating an exemplary data structure of a mount information table 500 that stores information on mounts. The mount information table 500 is stored in the mount/sticky note information storage module 150. The mount information table 500 includes amount ID column 510, a mount pattern ID column 515, a task column 520, a task attribute column 525, a creation date/time column 530, a creator column 535, an attribute column 540, and a project ID column 545. In the present exemplary embodiment, the mount ID column 510 stores information (mount ID) which uniquely identifies a mount. The mount pattern ID column 515 stores a mount pattern ID of a mount pattern which serves as a background. Examples of the mount pattern include a blank pattern (white paper), a tabular pattern, a pattern having a sticky note pasting region for each legend sticky note, and the like. The task column 520 stores a task. The task attribute column 525 stores an attribute of the task. The contents of the task attribute column 525 include, for example, "typical task" and "atypical task". The creation date/time column 530 stores the creation date/time of the mount. The creator column 535 stores a creator of the mount. The attribute column 540 stores an attribute. In the present exemplary embodiment, the project ID column 545 stores information (project ID) which uniquely identifies a project in which the mount is used. In the case of task management of an individual, the project ID may be a user ID of the individual.

FIG. 6 is an explanatory view illustrating an exemplary data structure of a project/mount correspondence table 600 that stores information on a project. The project/mount correspondence table 600 is stored in the mount/sticky note information storage module 150. The project/mount correspondence table 600 includes a project ID column 610, a number-of-members column 615, a member ID column 620, a mount number column 625, and a mount ID column 630. The project ID column 610 stores a project ID. The number-of-member column 615 stores the number of members in a project of that project ID. In the present exemplary embodiment, the member ID column 620 stores information (member ID) which uniquely identifies a member. The number-of-mounts column 625 stores the number of mounts used in the project. The mount ID column 630 stores amount ID of the mount used in the project. The mount ID column 630 stores mount IDs the number of which is identical to the value in the number-of-mounts column 625.

Figure 7:
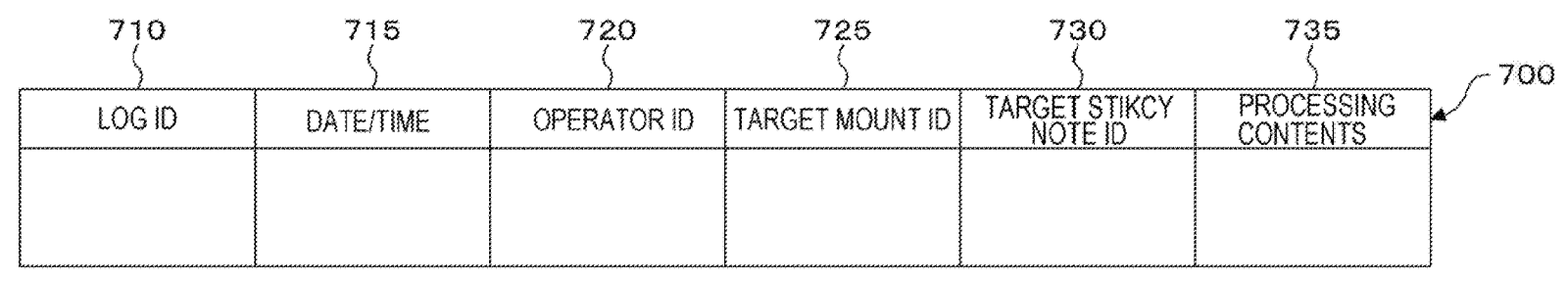

FIG. 7 is an explanatory view illustrating an exemplary data structure of a log information table 700 that stores information on a history (log) of operations performed for mounts or sticky notes. The log information table 700 is stored in the processing history storage module 160. The log information table 700 includes a log ID column 710, a date/time column 715, an operator ID column 720, a target mount ID column 725, a target sticky note ID column 730, and a processing content column 735. In the present exemplary embodiment, the log ID column 710 stores information (log ID) which uniquely identifies a log. The date/time column 715 stores date/time at which an operation stored as the log is performed. In the present exemplary embodiment, the operator ID column 720 stores information (operator ID) which uniquely identifies an operator who performed the operation. The target mount ID column 725 stores a mount ID of a target mount for which the operation is performed. For example, when copying of a sticky note among mounts is performed, the target mount ID column 725 stores plural mount IDs. The target sticky note ID column 730 stores a sticky note ID of a target sticky note for which the operation is performed. In the case of an operation is performed for plural sticky notes (including a grouped sticky note group), the target sticky note ID column 730 stores plural sticky note IDs. The processing content column 735 stores processing contents of the operation, for example, copies of a sticky note among mounts.

Figure 8:
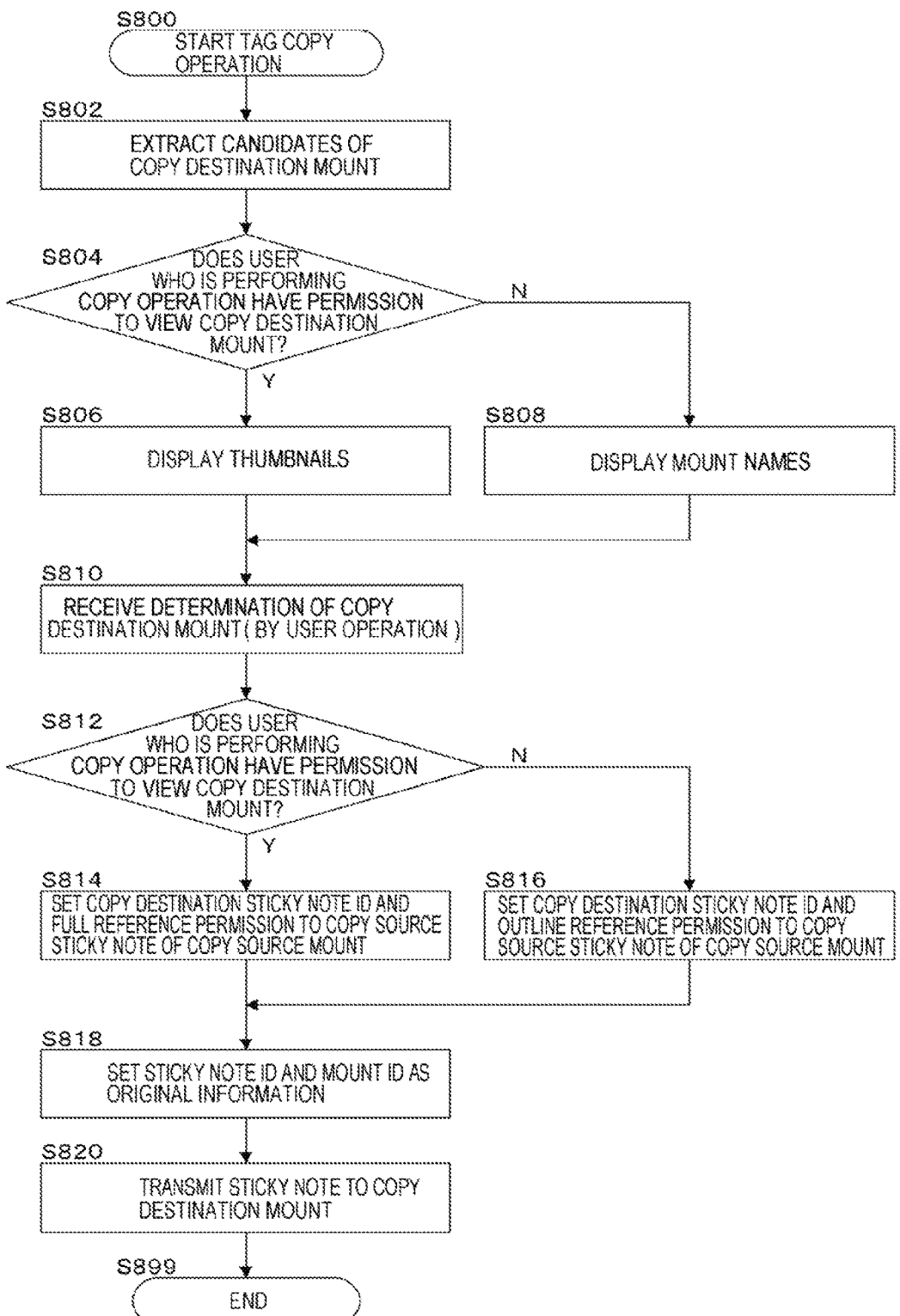
FIG. 8 is a flowchart illustrating an exemplary process according to the exemplary embodiment.

FIG. 8 is a flowchart illustrating an exemplary process according to the present exemplary embodiment.

In step S800, a sticky note copy operation is started.

In step S802, candidates of a copy destination mount are extracted. The candidates are mounts that a user who is performing the copy operation is accessible and are determined by the user.

In step S804, it is determined whether or not the user who is performing the copy operation has a permission to view the copy destination mount. If it is determined that the user has the view permission, the process proceeds to step S806. Otherwise, the process proceeds to step S808.

In step S806, thumbnails of the candidate mounts are displayed.

In step S808, mount names of the candidate mounts are displayed.

In step S810, determination of the copy destination mount is received according to an operation of the user.

In step S812, it is determined whether or not the user who is performing the copy operation has the permission to view the copy destination mount. If it is determined that the user has the view permission, the process proceeds to step S814. Otherwise, the process proceeds to step S816. For example, this determination may be made by referring to an access permission management table 900 to be described later with reference to FIG. 9.

In step S814, a copy destination sticky note ID and a full reference permission are set to a copy source sticky note of the copy source mount. Owing to this step, the copy destination sticky note is traced from the copy source.

In step S816, the copy destination sticky note ID and an outline reference permission are set to the copy-source sticky note of the copy source mount. Owing to this step, the progress outline is checked from the copy source.

In step S818, a sticky note ID and a mount ID are set as the original information.

In step S820, a sticky note is transmitted to the copy destination mount.

Figure 9:
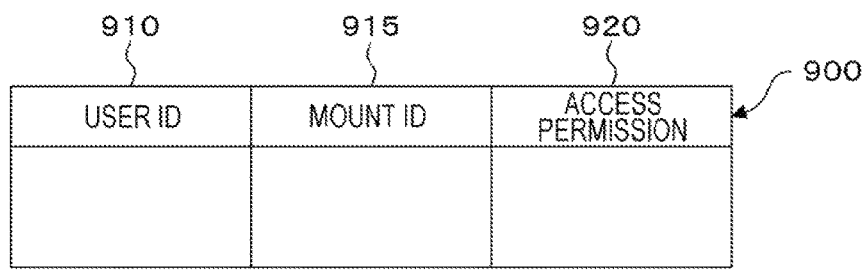
FIG. 9 is an explanatory view illustrating an exemplary data structure of an access permission management table.

FIG. 9 is an explanatory view illustrating a data structure example of the access permission management table 900 that stores information on the permission, possessed by a user, to access a mount. The access permission management table 900 is stored in the mount/sticky note information storage module 150. The access permission management table 900 includes a user ID column 910, a mount ID column 915, and an access permission column 920. In the present exemplary embodiment, the user ID column 910 stores information (user ID) which uniquely identifies a user. The mount ID column 915 stores a mount ID. The access permission column 920 stores an access permission that the user has with respect to the mount. Examples of the access permission may include a view permission, an edit permission, and the like. A permission premised on viewing, such as the edit permission, includes the view permission. In other words, if the user has the edit permission or the like premised on viewing, the user is treated as having the view permission.

Figure 10:
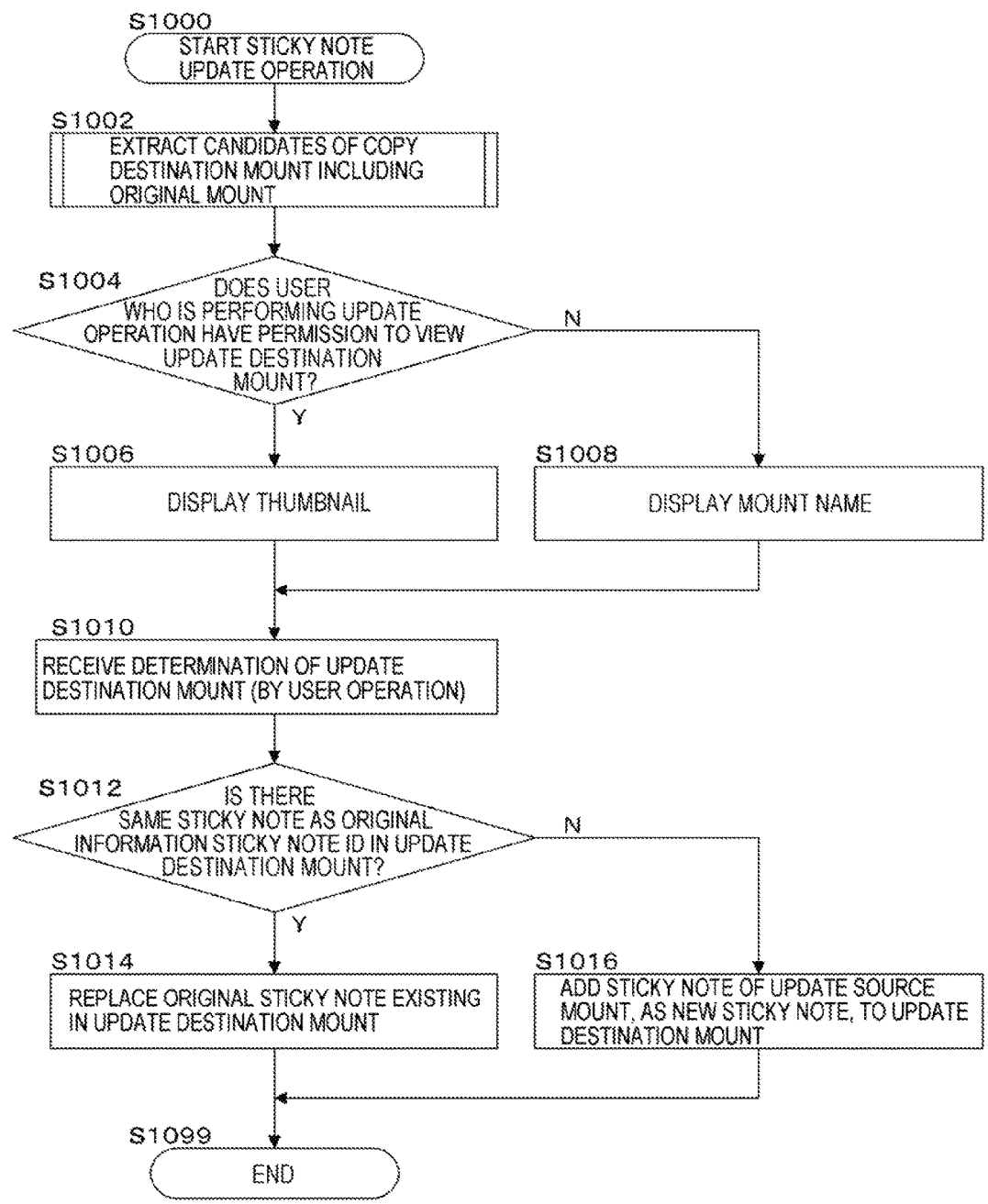
FIG. 10 is a flowchart illustrating an exemplary process according to the exemplary embodiment.

FIG. 10 is a flowchart illustrating an exemplary process according to the present exemplary embodiment.

In step S1000, a sticky note update operation is started.

In step S1002, candidates of a copy destination mount including the original mount are extracted. Details of the step S1002 will be described later with reference to a flowchart illustrated in an example of FIG. 11.

In step S1004, it is determined whether or not a user who is performing the update operation has the permission to view an update destination mount. If it is determined that the user has the view permission, the process proceeds to step S1006. Otherwise, the process proceeds to step S1008.

In step S1006, thumbnails of the candidate mounts are displayed.

In step S1008, mount names of the candidate mounts are displayed.

In step S1010, determination of the update destination mount is received according to an operation of the user.

In step S1012, it is determined whether or not there is a sticky note having the original information sticky note ID in the update destination mount. If it is determined that there is the sticky note having the original information sticky note ID, the process proceeds to step S1014. Otherwise, the process proceeds to step S1016.

In step S1014, the original sticky note existing in the update destination mount is replaced. That is, the sticky note of the update destination mount is rewritten to a sticky note of the update source. In step S1012, a sticky note to be replaced is determined based on whether or not the sticky note IDs are identical to each other. Alternatively, as described above, a sticky note to be replaced may be determined by tracing the copy source information column 432 and the copy destination information column 438 of the sticky note information table 400.

In step S1016, the sticky note of the update source mount is added, as a new sticky note, to the update destination mount.

Figure 11:
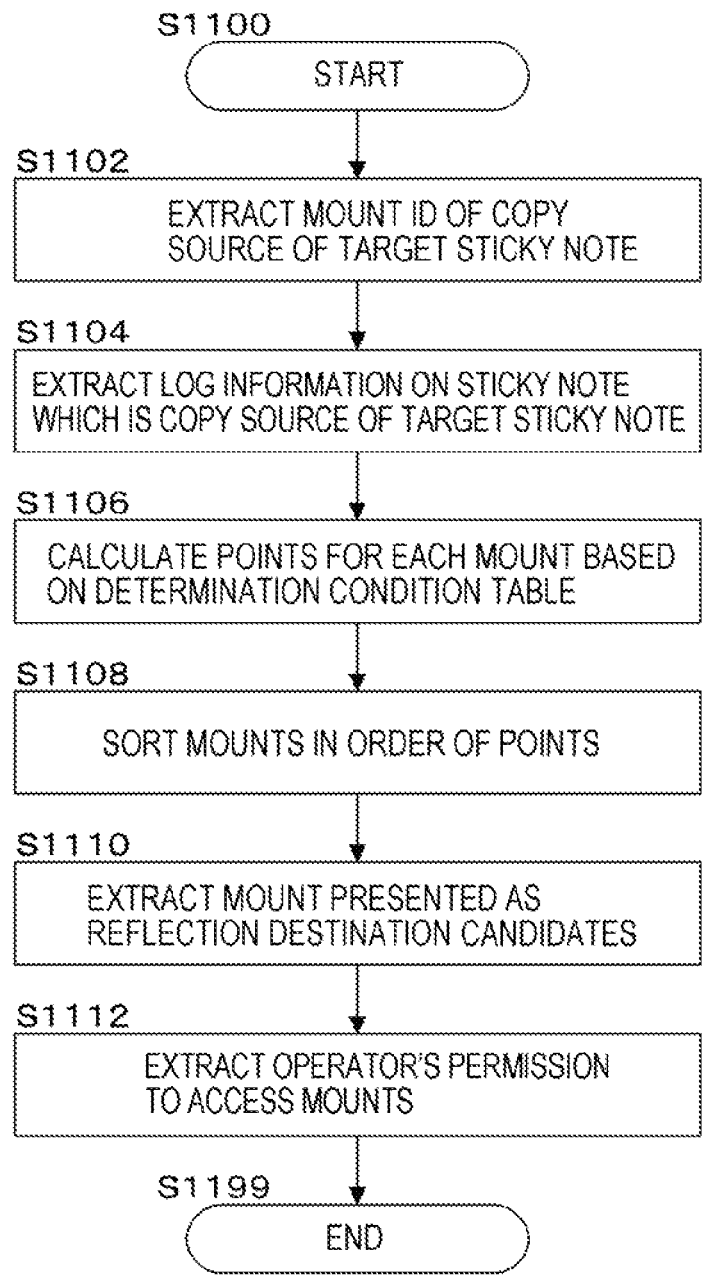
FIG. 11 is a flowchart illustrating an exemplary process according to the exemplary embodiment.

FIG. 11 is a flowchart illustrating an exemplary process according to the present exemplary embodiment.

In step S1102, a mount ID of the copy source of a target sticky note is extracted. Specifically, the mount ID of the copy source may be extracted by using the copy source information column 432 of the sticky note information table 400.

In step S1104, log information on a sticky note or the like which is the copy source of the target sticky note is extracted. Specifically, the log information table 700 related to the sticky note of the copy source is extracted.

In step S1106, points are calculated for each mount based on a determination condition table 1200. Specifically, using the determination condition table 1200 to be described later with reference to FIGS. 12A and 12B, points of the corresponding rule are added.

In step S1108, mounts are sorted in the order of points. Specifically, mounts are sorted in the descending order of points.

In step S1110, mounts to be presented as reflection destination candidates are extracted. For example, mounts up to a predetermined rank may be extracted, or mounts having points equal to or greater than a threshold value may be extracted.

In step S1112, the operator's permissions to access mounts are extracted. Specifically, the access permission management table 900 is used to extract the operator's permissions to access candidate mounts.

FIGS. 12A and 12B are explanatory views illustrating a data structure example of the determination condition table 1200 and a determination condition table 1250 that store pairs of mount extraction rules and additional points. The determination condition table 1200 illustrated in the example of FIG. 12A is stored in the mount/sticky note information storage module 150. The determination condition table 1200 includes an additional points column 1210 and a rule column 1220. The additional points column 1210 stores additional points for a case where each corresponding rule is met. The rule column 1220 stores rules. The determination condition table 1200 is used to extract mount candidates when a person in charge returns a sticky note to the project portal.

For example, the determination condition table 1200 illustrated in the example of FIG. 12A indicates that 20 points are added to a mount when the mount is a "mount to which the original sticky note has been moved," 10 points are added to a mount when the mount is a "mount onto which the original sticky note has been copied," "the number of times of movement×5" points are added to a mount when the mount is a "mount to which the parent sticky note of the original sticky note has been moved," "the number of times of copying×3" points are added to a mount when the mount is a "mount onto which the parent sticky note of the original sticky note has been copied," "the number of times of posting/editing×2" points are added to a mount "when a project member has made posting/editing in the past week (or other periods such as the past month or the past 3 days)," and "the number of times of posting×1" points are added to a mount "when there is "posting made by him/herself in the past." Points are added on a mount-by-mount basis.

Here, copying and moving are distinguished from each other. Copying is to copy a sticky note onto the copy destination while leaving the sticky note of the copy source. Accordingly, sticky notes are pasted on the both mounts. Moving is to move a sticky note to the movement destination without leaving the sticky note of the movement source. Accordingly, a sticky note is pasted only on the mount of the movement destination. Therefore, moving one sticky note gives higher points than copying the sticky note gives, which increases the possibility that a mount in interest is a mount to be reflected.

Whether or not a sticky note is a parent sticky note may be determined using the related sticky note information column 444 (the parent sticky note ID column 446) of the sticky note information table 400. Whether or not a project member is the same project member as that user may be determined using the project/mount correspondence table 600. The posting indicates that a new sticky note is created and pasted on a mount.

The determination condition table 1250 illustrated in the example of FIG. 12B is stored in the mount/sticky note information storage module 150. The determination condition table 1250 includes an additional points column 1260 and a rule column 1270. The additional points column 1260 stores additional points for a case where each corresponding rule is met. The rule column 1270 stores rules. The determination condition table 1250 is used to extract mount candidates when a project manager 1302 (see, for example, FIG. 13) allocates a sticky note to an individual portal. In other words, a method of extracting mount candidates is switched depending on whether a person logs in as a project manager or as a person in charge. In determining whether or not a person logs in as a project manager, a person who issues a code that a participant (person in charge) is accessible after a logging-in is regarded as a project manager, and a person who participates with that code is regarded as a person in charge. Specifically, when a conference is initiated, a participant initiates the conference as a project manager (issues a code) and allocates a sticky note (TODO) to a person in charge. The project manager may allocate a sticky note (TODO) alone when offline. On that account, there is provided an extraction condition that points are added depending on whether or not the person in charge logs in together.

For example, the determination condition table 1250 illustrated in the example of FIG. 12B indicates that 10 points are added to a mount if the mount is "a destination mount onto which a sticky note has been copied or moved during the current conference," 5 points are added to a mount if the mount is "a mount which is opened during the current conference," 10 points are added to a mount if the mount is a mount of a person in charge who logs in," and 5 points are added to a mount if the mount is "a mount of a person in charge who logs in and to whom TODO is not allocated." The points are added on a mount-by-mount basis.

It should be noted that when a user is a participant, the rules of the determination condition table 1200 illustrated in the example of FIG. 12A are applied. When a user is a project manager, the rules of the determination condition table 1250 illustrated in the example of FIG. 12B are applied. When a project manager is included in participants, both the rules of the determination condition table 1250 illustrated in the example of FIG. 12B and the rules of the determination condition table 1200 illustrated in the example of FIG. 12A are applied to the project manager. When a project manager is excluded from participants (for example, when a person logs in as a project manager), the rules of the determination condition table 1200 illustrated in the example of FIG. 12A may not be applied but only the rules of the determination condition table 1250 illustrated in the example of FIG. 12B may be applied.

Figure 13:
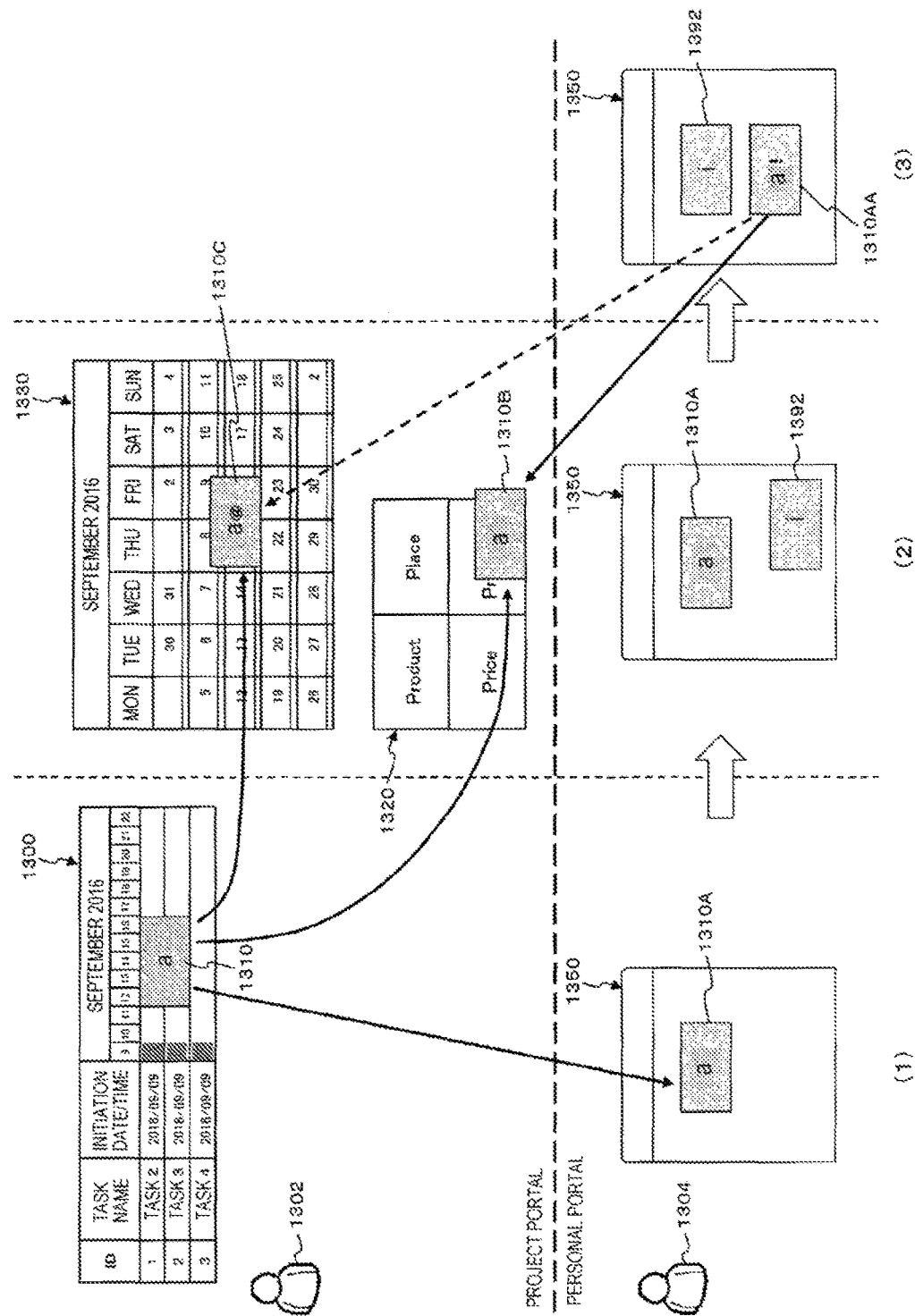
FIG. 13 is an explanatory view illustrating an exemplary process in the case of not using the exemplary embodiment.

FIG. 13 is an explanatory view illustrating an exemplary process in the case where the present exemplary embodiment is not used.

As shown in the upper part of the example in (1) of FIG. 13, in a project portal, a sticky note 1310 is pasted on a mount 1300 by an operation of a project manager 1302 or the like. The mount 1300 is a mount for schedule management and is used in a project. The sticky note 1310 is a TODO sticky note on which who (a person in charge B 1304), by when, and what to do are written.

Then, by an operation of the project manager 1302, the sticky note 1310 on the mount 1300 is copied onto a mount 1350 for task management which is an individual portal of the person in charge B 1304. That is, as illustrated in the lower part of the example of (1) of FIG. 13, a sticky note 1310A (a copy sticky note of the sticky note 1310) is pasted on the mount 1350.

Thereafter, as illustrated in the upper part of the example of (2) of FIG. 13, in the project portal, by an operation of the project manager 1302, the sticky note 1310 on the mount 1300 is copied, as a sticky note 1310B and a sticky note 1310C, onto a mount 1320 for 4P (Product, Price, Place, and Promotion) analysis and a calendar type mount 1330, respectively. This is because, for example, as the project progresses, it is preferable to perform the sticky-note work on the mount 1320 and the mount 1330, rather than performing the sticky-note work on the mount 1300.

Thereafter, as illustrated in the lower part of the example of (3) of FIG. 13, on the individual portal side, by an operation of the person in charge B 1304, the sticky note 1310A on the mount 1350 is rewritten (for example, description of an interim report, and the like) to a sticky note 1310AA. Since this sticky note 1310AA is different from the original sticky note 1310, content inconsistency occurs. That is, the content of the sticky note 1310AA edited by the person in charge B 1304 is not conveyed to the project manager 1302 (another participant of the project portal).

Therefore, the content of the sticky note 1310AA should be reflected to a mount on the project portal side. Here, assuming that the mount 1320 has already been mainly used for the project (that is, the mount 1300 is not used). In this case, even if the content of the sticky note 1310AA (or the sticky note 1310A before being edited) has been reflected to the mount 1300 which is the copy source of the sticky note 1310AA, the content of the sticky note 1310AA is still not conveyed to the project manager 1302 (another participant of the project portal).

Further, assuming that the sticky note 1310 is copied to plural mounts. In this case, even if it is attempted to reflect the sticky note 1300AA to a mount to which the sticky note 1310 is copied, it is unknown to which the sticky note 1310 should be reflected. Specifically, it may not be possible to determine which of the mount 1320 and the mount 1330 the sticky note 1310 should be reflected.

On the personal portal side, a sticky note 1392 is newly created on the mount 1350, as illustrated in the lower part of the example in (2) of FIG. 13. However, this sticky note 1392 is created for individual use and should not be reflected to a mount on the project portal side.

Figure 14:
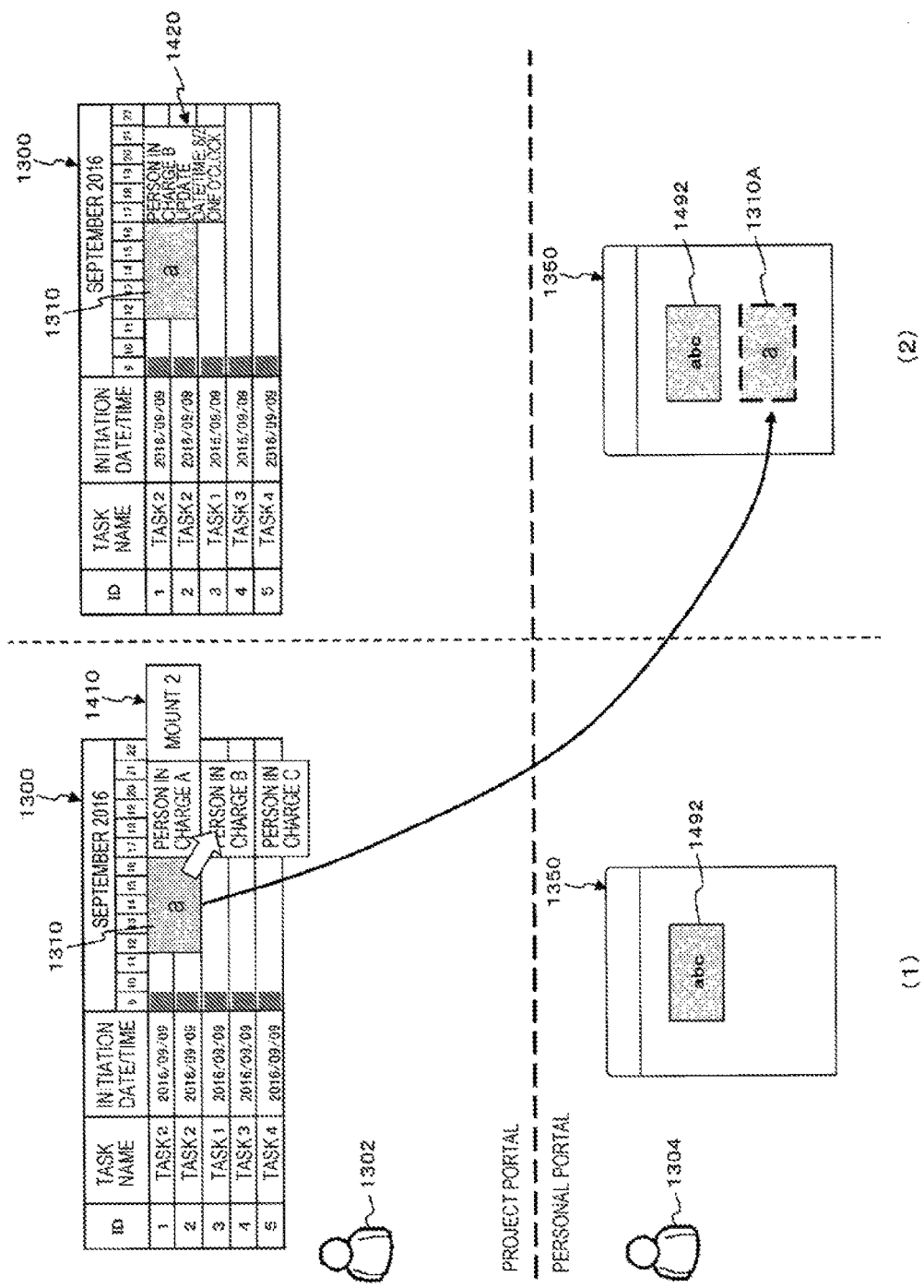
FIG. 14 is an explanatory view illustrating an exemplary process according to the exemplary embodiment.

FIG. 14 is an explanatory view illustrating an example of a process according to the present exemplary embodiment.

As illustrated in the upper part of the example of (1) of FIG. 14, in the project portal, by an operation of the project manager 1302 or the like, the sticky note 1310 is pasted on the mount 1300.

Then, if the sticky note 1310 on the mount 1300 is selected by an operation of the project manager 1302, copy destination candidates are displayed as a person-in-charge display area 1410. In addition to the persons in charge, mounts which are the copy destination candidates of the sticky note 1310 may be displayed in the person-in-charge display area 1410. In particular, if a person in charge has plural mounts, not only may the person in charge B set but also amount may be set. In this case, if the project manager 1302 has the permission to view a mount of the copy destination candidate, a thumbnail of the mount may be displayed. If the project manager 1302 does not have the view permission, only a mount name maybe displayed (see, for example, the process from step S804 to step S808 in the flowchart illustrated in the example of FIG. 8).

In the meantime, as illustrated in the lower part of the example in (1) of FIG. 14, in the personal portal of the person in charge B 1304, a sticky note 1492 is pasted on a mount 1350 for task management.

Then, as illustrated in the lower part of the example in (2) of FIG. 14, the sticky note 1310 is copied and pasted onto the mount 1350 for task management as a sticky note 1310A by the above-described copy operation. The mount 1350 is the personal portal of the person in charge B 1304.

Further, as illustrated in the upper part of the example in (2) of FIG. 14, on the project portal side, when the sticky note 1310 is selected, an outline display area 1420 indicating a situation of the sticky note 1310A may be displayed in a place (the mount 1350) where the sticky note 1310 is copied. In the example of (2) of FIG. 14, a message indicating that "the person in charge B 1304 has updated on 8/2 at 1 PM" is displayed.

Figure 15:
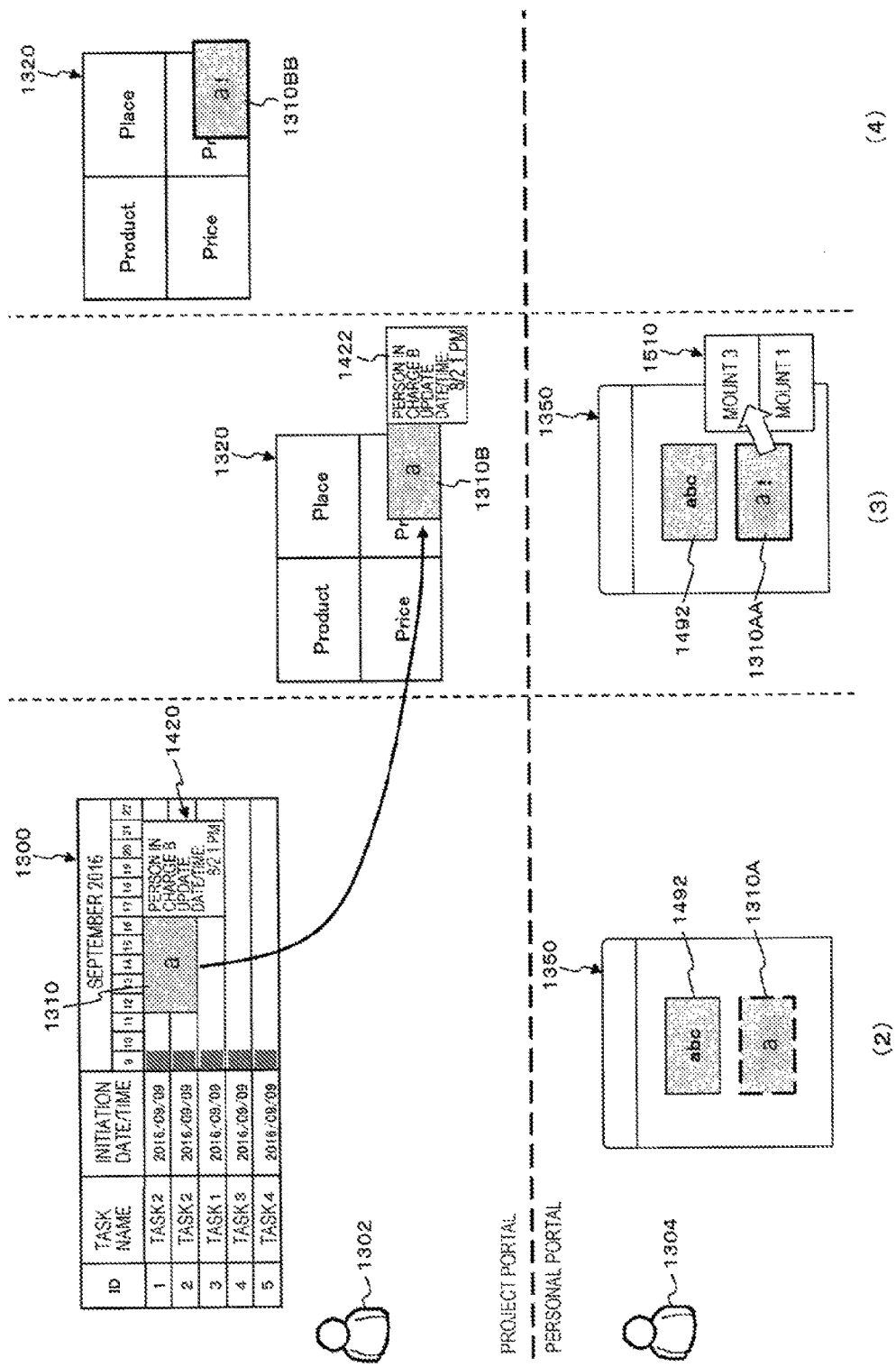
FIG. 15 is an explanatory view illustrating an exemplary process according to the exemplary embodiment.

FIG. 15 is an explanatory view illustrating an example of a process according to the present exemplary embodiment.

After the state illustrated in the example of (2) of FIG. 14, as illustrated in the upper part of the example of (2) and (3) of FIG. 15, the sticky note 1310 on the mount 1300 is copied, as a sticky note 1310B, onto the mount 1320 by an operation of the project manager 1302. The information equivalent to the outline display area 1420 on the mount 1300 may be displayed in an outline display area 1422 in the copied sticky note 1310B. Here, the sticky note 1310 may be copied onto plural mounts.

As illustrated in the lower part of the example of (3) of FIG. 15, on the personal portal side, the sticky note 1310A on the mount 1350 is rewritten (for example, description of an interim report, and the like) by an operation of the person in charge B 1304, to a sticky note 1310AA. That is, it may be required to reflect the sticky note 1310AA to a mount on the project side.

Therefore, the information processing apparatus 100 displays "mount 3 (mount 1320) and mount 1 (mount 1300)" in a reflection destination mount candidate display area 1510, as mount candidates of the reflection destination of the sticky note 1310AA. That is, the mount 1 (mount 1300) of the copy source and another mount (the mount 3 (mount 1320)) are presented in a selectable manner. If the person in charge B 1304 has the permission to view the mount 1300 and the mount 1320, thumbnails of the mount 1300 and the mount 1320 may be presented (see, for example, the step S1006 in the flowchart of the example illustrated in FIG. 10).

In addition, the mount 3 (mount 1320) is presented above the mount 1 (mount 1300) in the reflection destination mount candidate display area 1510. This indicates that it is more suitable to use the mount 3 (mount 1320) as the reflection destination of the sticky note 1310AA than the mount 1 (mount 1300). For example, if the number of times a project member performs posting/editing in the past week is larger in the mount 1320 than in the mount 1300, the mount 1320 is presented in preference to the mount 1300. This is because according to the determination condition table 1200, the points for the mount 1320 is larger than those for the mount 1300.

Then, if the mount 3 (mount 1320) in the reflection destination mount candidate display area 1510 is selected as the reflection destination by an operation of the person in charge B 1304, as illustrated in the upper part of the example of (4) of FIG. 15, the sticky note 1310B on the mount 1320 is rewritten to the content of the sticky note 1310AA and presented as a sticky note 1310BB (see, for example, the step S1014 of the flowchart illustrated in the example of FIG. 10).

If the number of times a project member performs posting/editing in a mount X having no sticky note of the copy source, for example, in the past week is larger than in the mount 1300 and the mount 1320, the mount X may be presented in preference and may be selected as a mount of the reflection destination. In that case, a sticky note corresponding to the sticky note 1310AA is newly created and pasted on the mount X (see the step S1016 of the flowchart illustrated in the example of FIG. 10).

Figure 16:
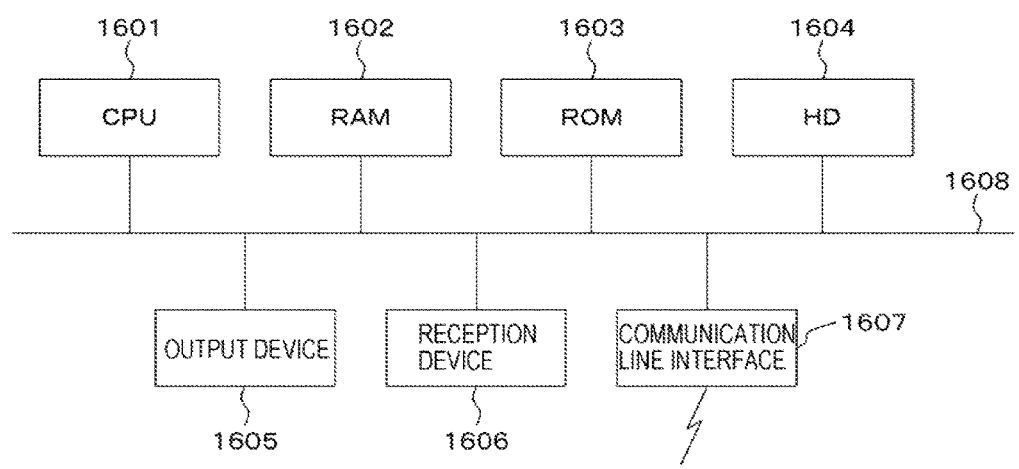
FIG. 16 is a block diagram illustrating an exemplary hardware configuration of a computer that implements the exemplary embodiment.

The hardware configuration of a computer on which a program according to the present exemplary embodiment is executed is a general-purpose computer, specifically, a personal computer, a computer serving as a server, or the like, as exemplified in FIG. 16. That is, as a specific example, a CPU 1601 is used as a processing unit (arithmetic unit), and a RAM 1602, a ROM 1603, and an HD 1604 are used as storage devices. A hard disk or a solid state drive (SSD) may be used as the HD 1604. The computer is configured with the CPU 1601 that executes programs of the mount/sticky note processing module 110, the related mount presentation module 120, the presentation module 130, the mount candidate extraction module 140, and the like, the RAM 1602 that stores the programs and data, the ROM 1603 in which programs for activating the computer are stored, the HD 1604 as an auxiliary storage device (such as a flash memory) having the functions as the mount/sticky note information storage module 150 and the processing history storage module 160, a reception device 1606 that receives data based on a user's operation on a keyboard, a mouse, a touch screen, a microphone, and the like, an output device 1605 such as a CRT, a liquid crystal display, a loudspeaker, and the like, a communication line interface 1607 that connects a communication network, such as a network interface card, and a bus 1608 that interconnects these components for data exchange. Plural computers configured with the above-mentioned components maybe interconnected via a network.

The above-described embodiments are implemented by reading a computer program, which is software, into a system of this hardware configuration and executing software and hardware resources in cooperation.

The hardware configuration illustrated in FIG. 16 is only one example. The present exemplary embodiment is not limited to the configuration illustrated in FIG. 16 but may be implemented by any configuration as long as the modules described in the present exemplary embodiment maybe executed. For example, some of the modules may be configured with dedicated hardware (for example, application specific integrated circuit (ASIC), and the like), some of the modules maybe in an external system and connected via a communication line. Further, plural systems illustrated in FIG. 16 may be interconnected via a communication line so as to operate in cooperation. The modules may be incorporated in a personal computer, a portable information communication device (including a mobile phone, a smartphone, a mobile device, a wearable computer, and the like), an information home appliance, a robot, a copier, a facsimile, a scanner, a printer, a multifunction device (an image processing apparatus having at least two functions of a scanner, a printer, a facsimile, and the like), or the like.

The above-described embodiment has been exemplified with a TODO sticky note. However, any sticky note may be used as long as it is a sticky note possibly edited by a mount of a copy destination.

In addition, although a mount for task management has been exemplified, a mount of other systems (for example, a schedule management system or the like) may be used.

In addition to display on a display device such as a liquid crystal display, the presentation may include an output as a three-dimensional (3D) image and furthermore may include a combination of printing by a printing device such as a printer, voice or vibration by an audio output device such as a loudspeaker, and the like, in addition to the personal computer.

The program described above may be stored in a recording medium or may be provided by a communication unit. In that case, for example, the program described above may be grasped as an invention of "a computer-readable recording medium storing a program".

The "computer-readable recording medium storing a program" refers to a computer-readable recording medium in which a program is recorded and which is used for installation, execution, distribution, and so on of programs.

Examples of the recording medium may include a digital versatile disc (DVD) such as "DVD-R, DVD-RW, DVD-RAM, and the like" which are standards formulated by the DVD Forum, "DVD+R, DVD+RW, and the like" which are standards formulated by DVD+RW, a compact disc (CD) such as a CD-ROM, a CD-recordable (CD-R), a CD-rewritable (CD-RW), and the like, a Blu-ray® disc, a magneto-optical disc (MO), a flexible disc (FD), a magnetic tape, a hard disk, a read only memory (ROM), an electrically erasable and rewritable read only memory (EEPROM®), a flash memory, a random access memory (RAM), a secure digital (SD) memory card, and the like.

The entire or part of the above-described program may be recorded in a recording medium for storage, distribution, and the like. Further, the entire or part of the above-described program may be transmitted by communications using transmission media such as a wired network, a wireless communication network or a combination thereof used for a local area network (LAN), a metropolitan area network (MAN), a wide area network (WAN), the Internet, an intranet, an extranet, and the like, or may be carried on a carrier wave.

Further, the above-described program may be a part or the entire of another program, or may be recorded on a recording medium together with a separate program. Further, it may be divided and recorded in plural recording media. Further, it may be recorded in any manner as long as it can be compressed or coded in a restorable manner.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to act as:
   a copying unit configured to copy a first sticky note pasted on a first mount onto a second mount as a second sticky note;
   an extracting unit configured, when the second sticky note is reflected to another mount, to extract a third mount in addition to the first mount as candidates; and
   a presentation unit configured to present the mounts extracted by the extracting unit in a selectable manner by the user's operation,
wherein the extracting unit extracts the third mount as the candidate according to a predetermined rule,
wherein the presentation unit presents the mounts in different forms depending on whether or not the user has a permission to view the mounts presented as the candidates, and
wherein when the user does not have permission to view the mounts, mount names are presented, and when the user has permission to view the mounts, thumbnails are presented.

2. The information processing apparatus according to claim 1, wherein
the predetermined rule includes at least one of:
(1) a mount onto which the first sticky note is copied or moved,
(2) a mount onto which a sticky note related to the first sticky note is copied or moved,
(3) a mount whose number of times operated by a participant of a group to which a user of the second mount belongs is equal to or greater than a predetermined value,
(4) a mount whose number of times operated by the user of the second mount is equal to or greater than the predetermined value,
(5) a destination mount onto which a sticky note is copied or moved during a current conference,
(6) a mount which is opened during the current conference,
(7) a mount of the respective person in charge who logs in, or
(8) a mount of a person in charge who logs in and to whom a TODO is not allocated.

3. The information processing apparatus according to claim 2, wherein
points are allocated to each of the items (1) to (8), and
the extracting unit extracts a candidate mount based on a sum of the points.

4. The information processing apparatus according to claim 3, wherein
if the user is a participant, the items (1) to (4) are applied, and
if the user is a project manager, the items (5) to (8) are applied.

5. The information processing apparatus according to claim 2, wherein
- if the user is a participant, the items (1) to (4) are applied, and
- if the user is a project manager, the items (5) to (8) are applied.

6. An information processing apparatus comprising:
- a copying means for copying a first sticky note pasted on a first mount onto a second mount as a second sticky note;
- an extracting means for, when the second sticky note is reflected to another mount, extracting a third mount in addition to the first mount as candidates; and
- a presentation means configured to present the mounts extracted by the extracting means in a selectable manner by a user's operation,
- wherein the extracting means extracts the third mount as the candidate according to a predetermined rule,
- wherein the presentation means presents the mounts in different forms depending on whether or not the user has a permission to view the mounts presented as the candidates, and
- wherein when the user does not have permission to view the mounts, mount names are presented, and when the user has permission to view the mounts, thumbnails are presented.

* * * * *